US012688339B2

(12) United States Patent
Shang et al.

(10) Patent No.: US 12,688,339 B2
(45) Date of Patent: Jul. 21, 2026

(54) METHODS AND DEVICES FOR COMPUTING A STATE OF AN ELECTROMECHANICAL OBJECT

(71) Applicant: ANSYS, Inc., Canonsburg, PA (US)

(72) Inventors: Wenkai Shang, Ratingen (DE); Davide Frigerio, Carugate (IT); Anna Margareta Kvarnström, Eklidsvägen (SE); Devin Earl Crawford, Holzkirchen (DE)

(73) Assignee: ANSYS, INC., Canonsburg, PA (US)

( * ) Notice: Subject to any disclaimer, the term of this patent is extended or adjusted under 35 U.S.C. 154(b) by 1137 days.

(21) Appl. No.: 17/344,187

(22) Filed: Jun. 10, 2021

(65) Prior Publication Data

US 2022/0019712 A1    Jan. 20, 2022

(30) Foreign Application Priority Data

Jul. 15, 2020    (DE) ..................... 10 2020 118 626.6

(51) Int. Cl.
G06F 30/20          (2020.01)
G06F 119/06         (2020.01)
G06F 119/08         (2020.01)

(52) U.S. Cl.
CPC .......... *G06F 30/20* (2020.01); *G06F 2119/06* (2020.01); *G06F 2119/08* (2020.01)

(58) Field of Classification Search
CPC ... G06F 30/20; G06F 2119/06; G06F 2119/08
See application file for complete search history.

(56) References Cited

U.S. PATENT DOCUMENTS 11,101,719 B2 *  8/2021  Yang ....................... B60L 50/10
2019/0197203 A1   6/2019  Catthoor et al.

OTHER PUBLICATIONS

Yang, X., et al. "An Improved Analytical Model of Permanent Magnet Eddy Current Magnetic Coupler Based on Electromagnetic-Thermal Coupling" IEEE Access, vol. 8, pp. 95235-95250 (May 2020) available from <https://ieeexplore.ieee.org/ abstract/document/ 9096303> (Year: 2020).*
Choi, C.T.M. & Konrad, A. "Finite Element Modeling of the RF Heating Process" IEEE Transactions on Magnetics, vol. 27, No. 5 (1991) (Year: 1991).*

(Continued)

*Primary Examiner* — Jay Hann
(74) *Attorney, Agent, or Firm* — WOMBLE BOND DICKINSON (US) LLP

(57) ABSTRACT

Methods and apparatuses for simulating an electromechanical object are described. An electromagnetic solver is invoked for an electromagnetic model of the object to generate an electromagnetic loss of the object an operating temperature. A temperature dependent electromagnetic loss of the object is determined based on the electromagnetic loss at the operating temperature. The temperature dependent electromagnetic loss varies according to a temperature of the object. A thermal solver is invoked for a thermal model of the object to estimate a temperature of the object based on the temperature dependent electromagnetic loss of the object and the operating temperature.

20 Claims, 4 Drawing Sheets

(56) References Cited

OTHER PUBLICATIONS

Driesen, J. et al. "Methodologies for Coupled Transient Electromagnetic-Thermal Finite-Element Modeling of Electrical Energy Transducers" IEEE Transactions on Industry Applications, vol. 38, No. 5 (2002) (Year: 2002).*

Jiang, W. & Jahns, T.M. "Development of Efficient Electromagnetic-Thermal Coupled Model of Electric Machines Based on Finite Element Analysis" IEEE Int'l Electric Machines & Drives Conf. (2013) available from <https://ieeexplore.ieee.org/abstract/document/6556187> (Year: 2013).*

Wang, Y., et al. "Ultrafast Steady-state Multi-physics Model for PM and Synchronous Reluctance Machines" IEEE Transactions on Industry Applications, vol. 51, issue 5 (2015) available from <https://ieeexplore.ieee.org/abstract/document/7080858> (Year: 2015).*

Fatemi, A., et al. "Computationally Efficient Strand Eddy Current Loss Calculation in Electric Machines" IEEE Transactions on Industry Applications, vol. 55, No. 4 (2019) (Year: 2019).*

Yu, W., et al. "Coupled Magnetic Field-Thermal Network Analysis of Modular-Spoke-Type Permanent-Magnet Machine for Electric Motorcycle" IEEE Transactions on Energy Conversion, vol. 36, No. 1 (Mar. 2021; date of publication: Jun. 30, 2020) (Year: 2020).*

Sergaki, E., et al. "Fuzzy Logic Based Online Electromagnetic Loss Minimization of Permanent Magnet Synchronous Motor Drives" IEEE Proceedings of 2008 Int'l Conf. on Electrical Machines, Paper ID 1405 (2008) (Year: 2008).*

Nicolas Bracikowski et al., "Multiphysics Modeling of a Permanent Magnet Synchronous Machine by Using Lumped Models", IEEE Transactions on Industrial Electronics, vol. 59, No. 6, Jun. 2012, total 12 pages.

Yi Wang et al., "Ultrafast Steady-State Multiphysics Model for PM and Synchronous Reluctance Machines", IEEE Transactions on Industry Applications, vol. 51, No. 5, Sep./Oct. 2015, total 8 pages.

Solve Thermal Model, "Copper Loss Variation with Temperature", total 2 pages.

* cited by examiner

300

400a

METHODS AND DEVICES FOR COMPUTING A STATE OF AN ELECTROMECHANICAL OBJECT

CROSS-REFERENCE TO RELATED APPLICATIONS

This application claims benefits of a German Patent Application. No. 10 2020 118 626.6 entitled "Verfahren and Vorrichtungen zur Berechnung eines Zustands eines elektromechanischen Objekts", filed Jul. 15, 2020. The contents of which are hereby incorporated by reference in its entirety for all purposes.

BACKGROUND

Multiphysics simulations can be defined as coupled processes or systems comprising more than one physical model in order to describe a behavior of a physical object, such as a motor or an antenna. In particular, multi physics simulations can operate by simultaneously and/or iteratively executing different models each relating to a specific physical behavior of the object. The models can be constructed, for example, based on differential equations or transfer functions. The systems described by the models can refer in particular to objects that comprise both electromagnetic, mechanical and/or thermal effects, such as electric motors. The models of a multi-physics simulation are coupled with each other, such that e.g. an output parameter of a electro-mechanical model is used as input parameter of a thermal model. It is known to perform several computational iterations for each model in order to achieve an accurate solution. For example, the calculation can be aborted if changes in the coupling parameters between successive iterations remain below a predefined threshold. However, depending on the object to be modelled by the multi-physical system, this may require many iterations, and thus a correspondingly large amounts of computation time and computer resources. Improvements in this area are desirable.

TECHNICAL FIELD

The present disclosure relates to methods and devices for computing one or more states of an electromechanical object.

SUMMARY OF THE DESCRIPTION

The disclosure describes techniques (e.g. methods, systems or devices etc.) which can improve multi-physics simulations. In particular, the disclosed techniques can improve computation time and computation accuracy of multi-physics simulations.

This problem is solved by the disclosed techniques, which are defined by the subject matter of the independent claims. The dependent claims relate to corresponding embodiments. In the following, different aspects and embodiments of these aspects are disclosed, which provide additional features and advantages.

Some embodiments can include operations performed to simulate an iterative coupling of an electromagnetic model and a thermal model. The electromagnetic model is used to represent the electromagnetic properties of an object to be simulated. The computation of the electromagnetic model results in an electric and/or magnetic loss. This can be a loss which is caused e.g. by eddy currents in the ferromagnetic components and/or the iron core of an electric motor.

Because the losses are also temperature-dependent, each resulting loss parameter is related to a certain temperature. This can be the temperature that is valid for the whole iteration step of computing the electromagnetic the model. The electromagnetic loss is communicated from the electromagnetic model to the thermal model. Based on the thermal model, the electromagnetic loss is updated. This update is based on material properties of the motor comprised by the thermal model. Such material properties can be e.g. a temperature-dependent electrical resistivity of a ferromagnetic component and/or of an iron core of an electric motor. With the updated losses, a temperature field for the motor can be computed more accurately. This temperature field can then be communicated back to the electromagnetic model in order to compute a further iteration.

BRIEF DESCRIPTION OF THE DRAWINGS

Advantages and features of the present disclosure are illustrated in the following figures. The figures describe the embodiments in principle and not to scale. The dimensions of the various features may be enlarged or reduced, in particular to facilitate an understanding of the described technology.

In the following descriptions, identical reference signs refer to identical or at least functionally or structurally similar features. References are made to the accompanying figures which form part of the disclosure and which illustrate specific aspects in which the present disclosure can be understood.

In general, a disclosure of a described method also applies to a corresponding device (or apparatus) for carrying out the method or a corresponding system comprising one or more devices and vice versa. For example, if a specific method step is described, a corresponding device may include a feature to perform the described method step, even if that feature is not explicitly described or represented in the figure. On the other hand, if, for example, a specific device is described on the basis of functional units, a corresponding method may include one or more steps to perform the described functionality, even if such steps are not explicitly described or represented in the figures. Similarly, a system can be provided with corresponding device features or with features to perform a particular method step. The features of the various exemplary aspects and embodiments described above or below may be combined unless expressly stated otherwise.

DETAILED DESCRIPTION

Figure 1:
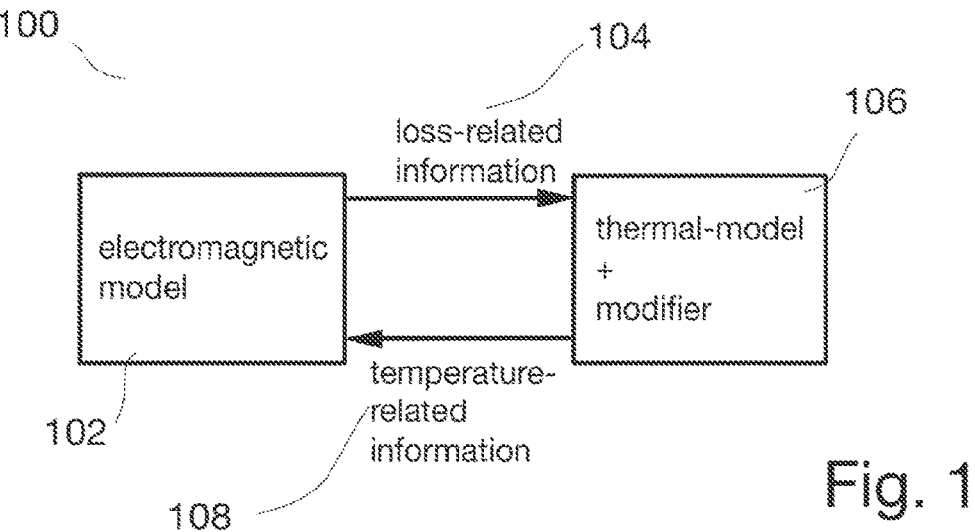
FIG. 1 shows a block diagram of a method according to an embodiment of the disclosure.

FIG. 1 discloses a block diagram 100 of a method for computing a state of an electromechanical object, according to an embodiment of the present disclosure. The method involves an iterative operation of an electromagnetic model 102 and a computational fluid dynamical (CFD) model, which comprises a thermal model 106. The output of the electromagnetic model is a loss-parameter $Q_{EM}$, which is computed based at a certain temperature $T_{n-1}$. The loss parameter and the temperature parameter are provided as loss-related information 104 to the CFD model, Based on the CFD model an update $\Delta Q$ of the loss parameter $Q_{EM}$ is computed. The update is computed by a loss modifier F according to the following general formula: $\Delta Q = Q(T_{n-1}) \cdot F (T_n)$. Several implementations of the loss modifier are possible.

For example, a loss modifier for a conductor with a current source can be implemented with $$Q(T_{n-1}) := \rho(T_{n-1}) \cdot J_{rms}^2(T_{n-1}) \text{ and } F(T_n) := \alpha \cdot (T_n - T_{n-1}),$$

wherein $\rho$ is the electrical resistivity and $J_{rms}$ is a current density.

The loss modifier for a conductor with a voltage source can be implemented with $$Q(T_{n-1}) := \rho(T_{n-1}) \cdot J_{rms}^2(T_{n-1}) \text{ and } F(T_n) := \left( \frac{1}{1 + \alpha \cdot (T_n - T_{n-1})} - 1 \right).$$

The update $\Delta Q$ can then be added to the loss Q_(EM) received from the electromagnetic model to arrive at an updated value for $Q_{EM}$. The loss parameter $Q_{EM}$ used for the calculation of the update $\Delta Q$ can he different from the loss parameter $Q_{EM}$ to which the update $\Delta Q$ is added. For example, the loss parameter $Q_{EM}$ used for the calculation of the update $\Delta Q$ can be a complexity-reduced representation of the loss $Q_{EM}$ actually computed by electromagnetic model. The complexity reduction can be performed in the electromagnetic model before the loss-related information is provided to the thermal model. Additionally or alternatively, a complexity reduction or a pre-processing can also be performed in the thermal model.

Based on the updated loss an inhomogeneous temperature field 108 is computed based on the thermal model 106. This temperature field describes the different temperatures relevant for the electromechanical object. The temperature field 108 is provided to the electromagnetic model 102, for a further iteration.

The method is terminated after a consistent solution is reached, i.e. if the differences between two consecutive instances of the loss $Q_{EM}$ as provided by the electromagnetic model remain below a predefined threshold.

Figure 2:
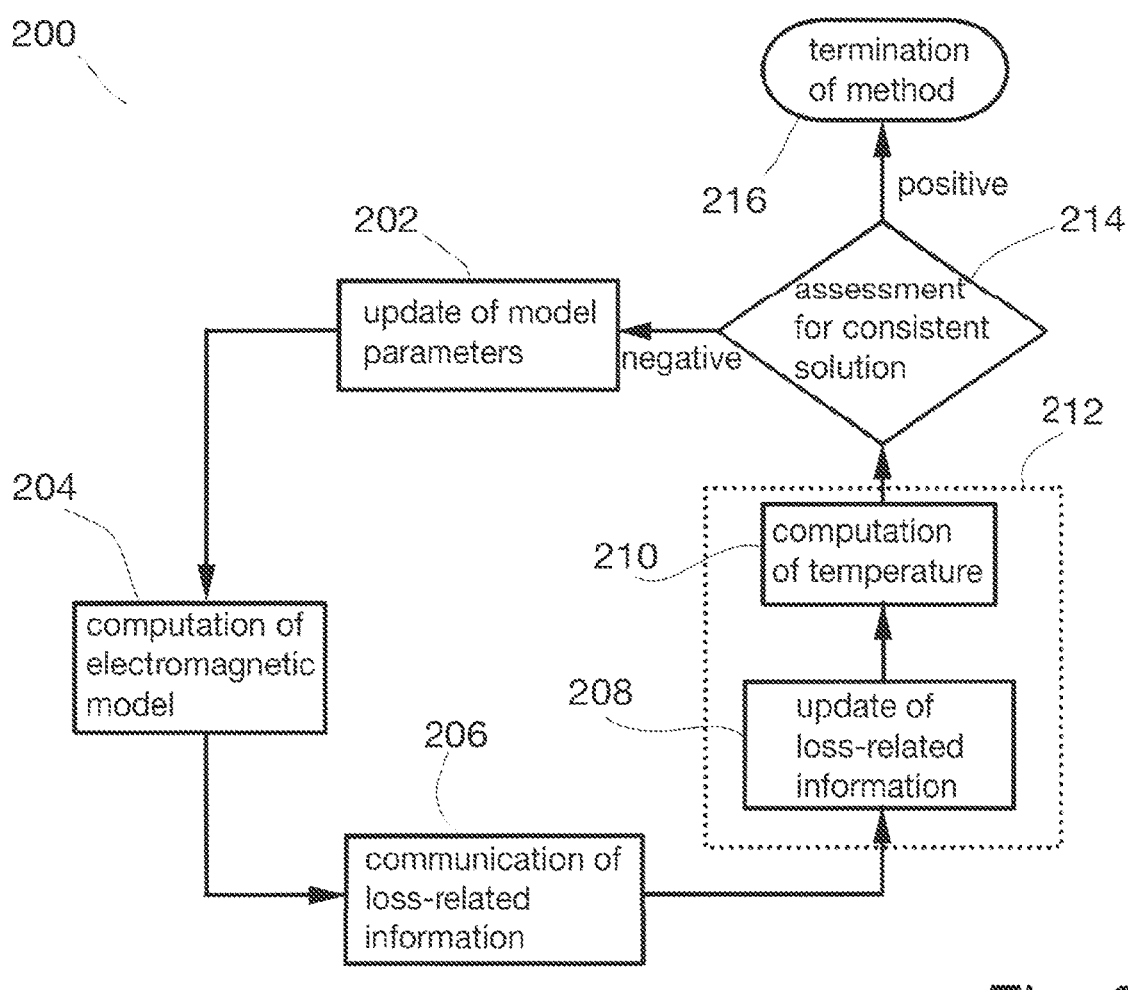
FIG. 2 show a flow diagram of a method according to an embodiment of the disclosure.

FIG. 2 discloses a flow diagram 200 of a method for computing a state of an electromechanical object, according to an embodiment of the present disclosure. In this embodiment, the electromechanical object can be e.g. an electrical motor. The method is performed by a plurality of iterations, whereby for each iteration one loop of the flow diagram 200 has to be completed. At the end of each loop it is evaluated if a consistent solution has been obtained. This is done by step 214. If the evaluation is confirmed positive and a consistent solution has been reached, the method is terminated by step 216.

The first iteration of method is started by providing initial parameters 202 that refer to a temperature and material properties of the electromechanical object. The parameter that refers to the temperature is a homogeneous temperature field. Therefore it can be expressed by a constant $T_1(r)=T_1$. (The parameter r refers to the spatial distribution of the temperature field.) For example the constant $T_1$ can be an initial estimate of the temperature of the motor and/or its environment. Additionally or alternatively, it can be a measurement observed by one or more temperature sensors. One of the parameters that refer to material properties can be a homogeneous electrical resistivity $\rho_1$, e.g. the electrical resistivity of a coil of an electrical motor. The electrical resistivity $\rho_1$ is dependent on the initial temperature $T_1$, which is therefore $\rho_1=\rho_1(T_1)$.

Based on the initial parameters $T_1$ and $\rho_1$ the electromagnetic model is computed in step 204. The result can comprise quantities as torques, voltages, current densities, rotation speeds, magnetic field strengths, and/or electromagnetic losses Q. The losses can be spatially distributed such that $Q:=Q(x, y, z)=Q(r)$, wherein x, y, z are spatial coordinates relative to the electrical motor that can also abbreviated by the parameter r. The electromagnetic losses $Q_{EM}$ are computed at the temperature $T_1$. The loss-related information computed based on the electromagnetic model is communicated to the thermal model during step 206. In the thermal model the losses are updated based on temperature $T_1$ and based on material properties of the electromechanical object $\rho_1$. This is done in step 208. In particular the reference temperature $T_1$, which was the basis of the computation of the losses in the electromagnetic model, can therefore also be sent to the thermal model. In the thermal model an updated $Q_1(r, T)$ based on the loss-related information computed in the electromagnetic model is computed. In particular the thermal dependencies of the material properties $\rho_1(T)$ and their effect on the loss are computed in the thermal model and based on this result the loss information obtained from the electromagnetic model is updated to obtain the updated loss information $Q_1(r, T)$. This can be done according to the relationship $$Q_1(r, T) \approx Q_1^0(r) + \Delta Q(J, B) \cdot \alpha(r) \cdot (T(r) - T_0),$$

wherein the term $$Q_1^0(r)$$

relates to the loss computed by the first iteration of the electromagnetic solver, $\Delta Q(J, B)$ represents the loss contribution due to electromagnetic fields, J represents the relevant current density, B represents the relevant magnetic field, $\alpha$ represents electromagnetic material parameters such as $\rho_1$ or other relevant electromagnetic material properties, and r represents a spatial parameter, e.g. x, y, and z coordinates.

The temperature field to be computed by the thermal model, which can also be referred to as a thermal solver, can be an inhomogeneous temperature field T(r). The thermal solver updates the temperature field in step 210. In a first iteration, i.e. in a first completion of the loop of the flow chart 200, the first instance of the second information can be the inhomogeneous temperature field $T_2(r)$. This is done without the need to re-run the electromagnetic model.

Before a further iteration is performed, it is assessed in step 214 if the updated temperature field equals the preceding temperature field. For example, in the first iteration it is assessed if $T_2$ (r)=$T_1$. If this is the case, then a consistent solution has been reached and the method can be terminated. If this is not true, then $T_2$(r) is provided to the electromagnetic model for a second iteration. Furthermore, also the material properties, e.g. ρ (r)=ρ($T_2$(r)) are updated in the next instance of step 202 and provided to the electromagnetic model. Based on the new information and based on the electromagnetic model a new instance of loss-related information $Q_{EM}$ is computed.

For computation of an n-th iteration (wherein n>1), the method can also be described as follows. An inhomogeneous temperature field $T_n$(r), which was computed by the thermal model, is assessed if it equals the previous temperature field $T_{n-1}$(r). If this is assessed positive, the n-th iteration is not started. If this is assessed negative the n-th iteration is started by updating material properties r(r)=r($T_{n-1}$(r)) and providing them to the electromagnetic model. The electromagnetic model is evaluated resulting in parameters $J_n$ and $B_n$. The parameter $J_n$ and $B_n$ are provided to the thermal model. In the thermal model the (updated) loss is computed according to $$Q_n(r, T) \approx Q_n^0(r) + \Delta Q(J_n, B_n) \cdot \alpha(r) \cdot (T_n(r) - T_{n-1}(r)).$$

Based on the loss information and on the thermal model, the temperature field is updated to $T_{n+1}$ (r).

Figure 3:
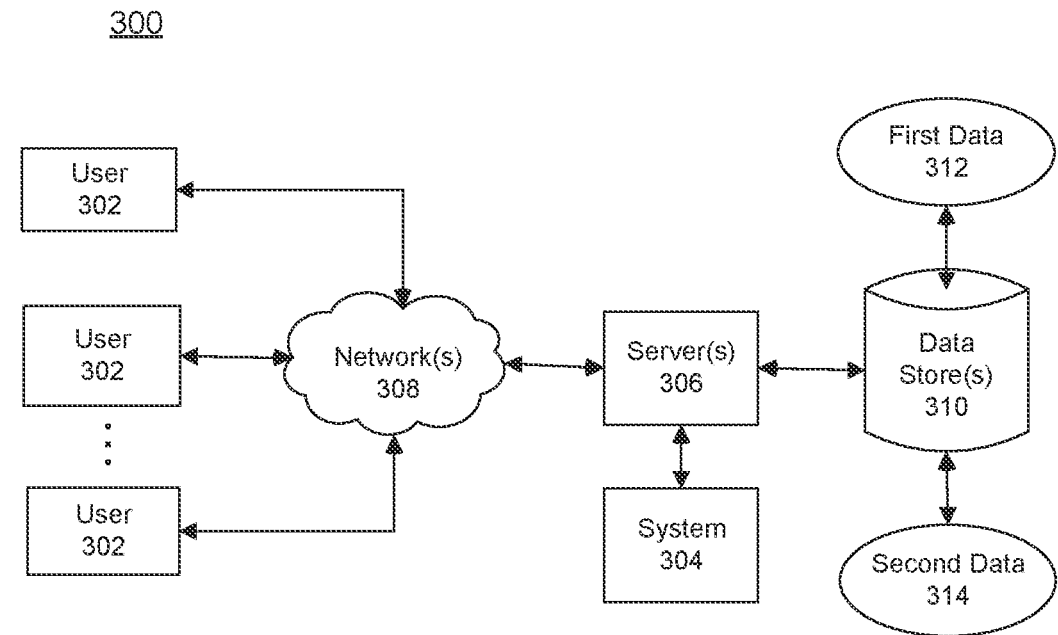
FIG. 3 show a block diagram illustrating a computer-implemented environment according to an embodiment of the disclosure.

FIG. 3 depicts a computer-implemented environment 300 wherein users 302 can interact with a system 304 hosted on one or more servers 306 through a network 308. The system 304 contains software operations or routines. The users 302 can interact with the system 304 through a number of ways, such as over one or more networks 308. One or more servers 306 accessible through the network(s) 308 can host system 304. The processing system 304 has access to a non-transitory computer-readable memory in addition to one or more data stores 310. The one or more data stores 310 may contain first data 312 as well as second data 314. It should be understood that the system 304 could also be provided on a stand-alone computer for access by a user.

Figure 4A:
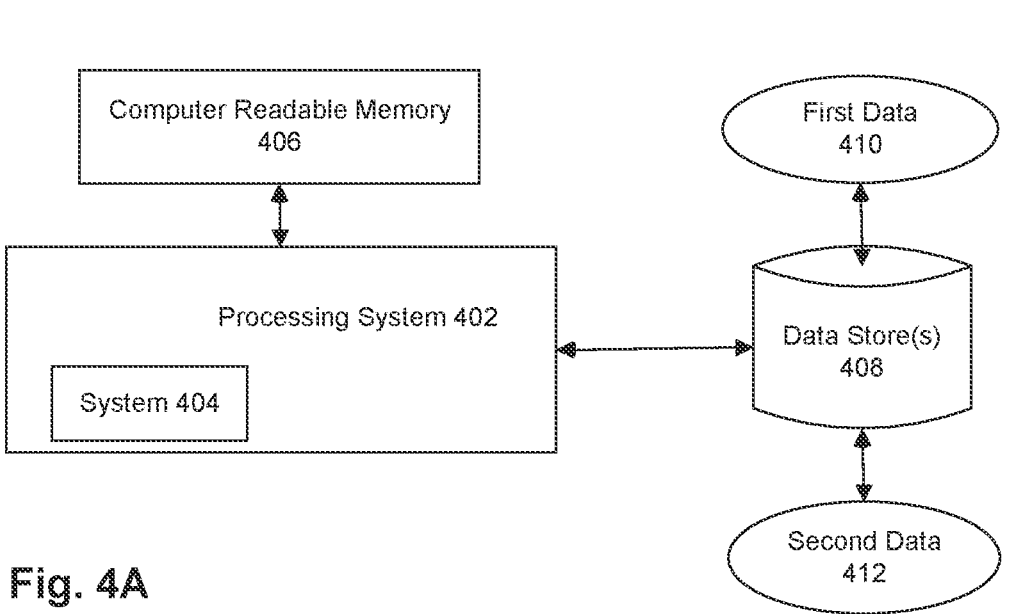
FIG. 4A shows a block diagram illustrating an exemplary system that includes an independent computer architecture according to an embodiment of disclosure.
Figure 4B:
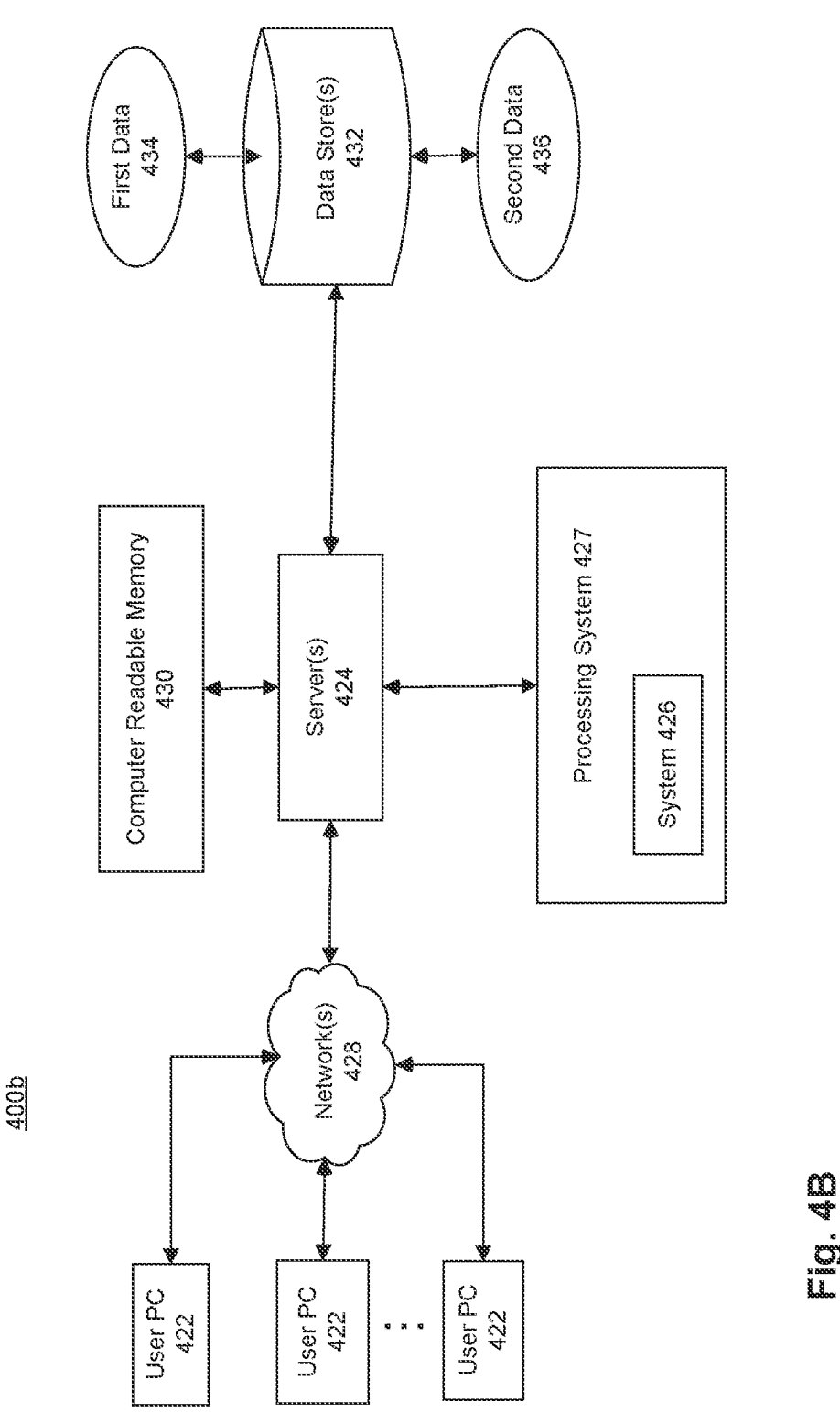
FIG. 4B shows a block diagram illustrating an exemplary system that includes a client-server architecture according to an embodiment of the disclosure.
Figure 4C:
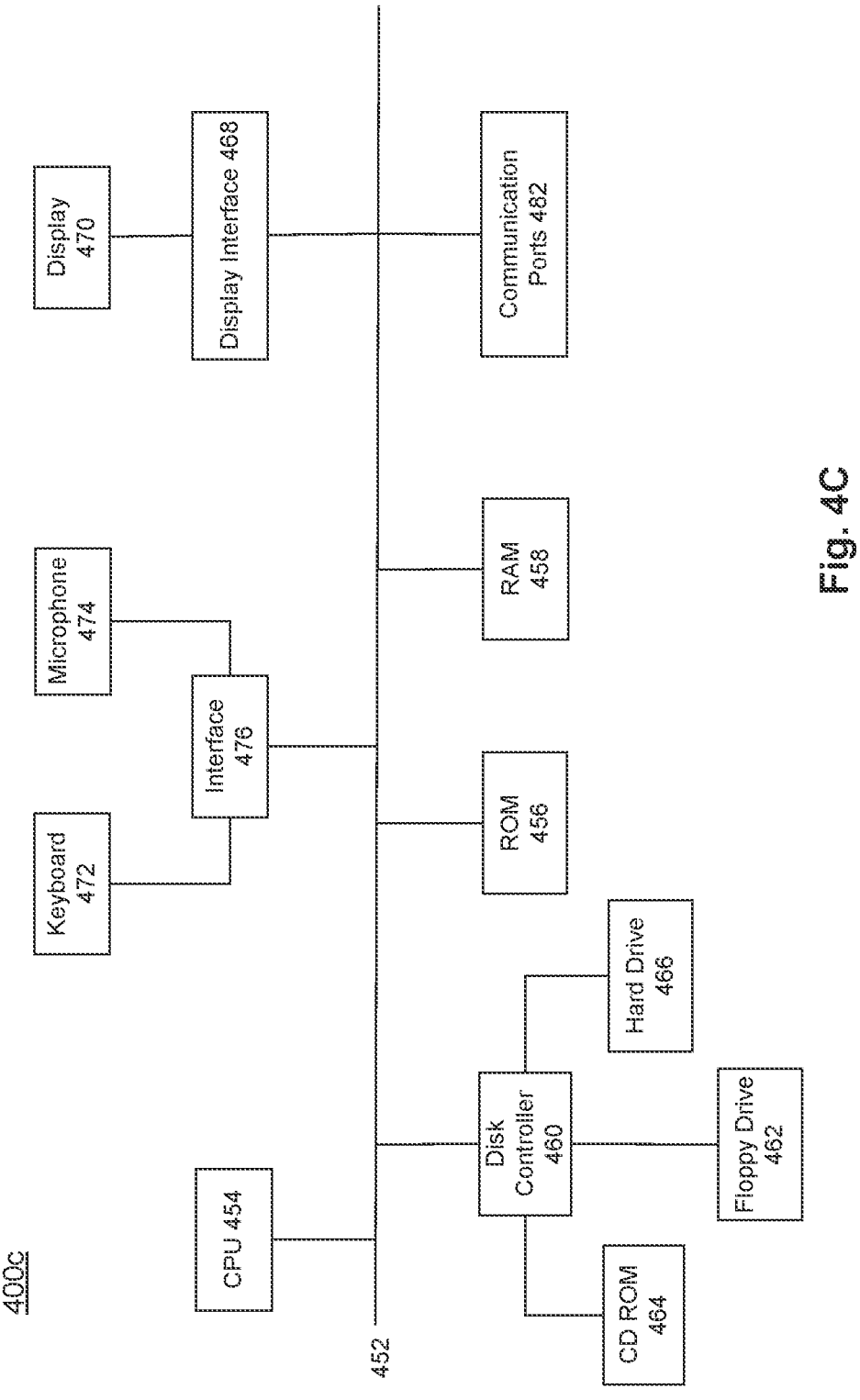
FIG. 4C shows a block diagram illustrating an exemplary hardware for a standalone computer architecture according to an embodiment of the disclosure.

FIGS. 4A, 4B and 4C depict example systems for use in implementing a system. For example, FIG. 4A depicts an exemplary system 400*a* that includes a standalone computer architecture where a processing system 402 (e.g., one or more computer processors) includes a system 404 being executed on it. The processing system 402 has access to a non-transitory computer-readable memory 406 in addition to one or more data stores 408. The one or more data stores 408 may contain first data 410 as well as second data 412.

FIG. 4B depicts a system 400*b* that includes a client server architecture. One or more user PCs 422 can access one or more servers 424 running a system 426 on a processing system 427 via one or more networks 428. The one or more servers 424 may access a non-transitory computer readable memory 430 as well as one or more data stores 432. The one or more data stores 432 may contain first data 434 as well as second data 436.

FIG. 4C shows a block diagram of exemplary hardware for a standalone computer architecture 400*c*, such as the architecture depicted in FIG. 4A, that may be used to contain and/or implement the program instructions of system embodiments of the present disclosure. A bus 452 may serve as the information highway interconnecting the other illustrated components of the hardware. A processing system 454 labeled CPU (central processing unit) (e.g., one or more computer processors), may perform calculations and logic operations required to execute a program. A non-transitory computer-readable storage medium, such as read only memory (ROM) 456 and random-access memory (RAM) 458, may be in communication with the processing system 254 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 460 interfaces one or more optional disk drives to the system bus 452. These disk drives may be external or internal floppy disk drives such as 462, external or internal CD-ROM, CD-R, CD-RW or DVD drives such as 464, or external or internal hard drives 466. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 460, the ROM 456 and/or the RAM 458. Preferably, the processor 454 may access each component as required.

A display interface 468 may permit information from the bus 456 to be displayed on a display 470 in audio, graphic, or alphanumeric format. Communication with external devices may optionally occur using various communication ports 482.

In addition to the standard computer-type components, the hardware may also include data input devices, such as a keyboard 472, or other input device 474, such as a microphone, remote control, pointer, mouse, touchscreen and/or joystick. These input devices can be coupled to bus 452 via interface 476.

A first aspect relates to a method comprising the steps:
computing a first instance of a first information based on an electromagnetic model;
providing the first instance of the first information to a thermal model;
computing an update of the first instance of the first information based on the thermal model.

A method for computing a state of an electromechanical object comprises the computation of two different models. An electromagnetic model and a thermal model, in order to compute a state of an electromechanical object. Therefore, the method can also be termed a multi-physics simulation.

An "electromechanical object" according to this disclosure can be any object or any function of an object that comprises electrical and mechanical parameters. The parameters can also comprise temperature-related parameters, for example temperature which is generated by eddy currents and/or temperature which is generated by energy dissipated from a mechanical oscillation. An electromechanical object can be an electric machine, e.g. an electrical motor, an antenna, a manually operated electrical switch, a relay, a component for power distribution, a transformer, a busbar, an heating device, e.g. an induction heating device, etc. Furthermore, also a biological object can be an electromagnetic object. For example, a brain comprises electric signals and mechanical fluids that move through it. Therefore a brain can be an electromechanical object as well. Electromechanical objects can be modelled by multi-physics simulations that comprise an electromagnetic model and a mechanical model. The models can be based on differential and/or statistical equations. Both models can be solved for by analytical and/or numerical methods. The mechanical model can comprise a thermal model. Or the thermal model can comprise a mechanical model and/or be embedded into a mechanical model. It can also solely consist of a thermal model. The electromagnetic model can also comprise a thermal model. The mechanic model can comprise a fluid dynamical model.

A "computation" of a multi-physics simulation can be done by a computer-implemented method. Thereby a computer can be a desktop personal computer or a laptop personal computer. Furthermore, a computer can be a computer of a datacenter. Additionally or alternatively, the computation of a multi-physics simulation can be done on an electronic chip, such as a digital signal processor, and/or a microcontroller. The multi-physics simulation can run as software on one of these platforms. Additionally or alternatively, a computation of a multi-physics simulation can also be performed in a distributed computation system such as a cloud or a computer network. Additionally or alternatively, the multi-physics simulation can also be performed by hardwired electrical systems, such as FPGAs and/or systems that mainly comprise active and passive electrical components such as resistors, capacitors, inductors, diodes, thyristors, and transistors.

A "first information" can be any information produced by the electromagnetic model. In particular the first information can comprise a loss-related information and/or a temperature-related information. This will be explained in more detail later. Additionally or alternatively, a first information can comprise a current information, e.g. a current density and/or a voltage-related information, e.g. a difference of two electric potentials. Additionally or alternatively, a first information can comprise a magnetic field and/or a magnetic flux information. A first information can also comprise information on the material of the components of the electromechanical object, such as an electrical and/or magnetic impedance. This will be explained in more detail later.

An "instance" in the meaning of this disclosure can be defined as a result of an electromagnetic model or of a mechanical model in a single iteration of computation. Additionally or alternatively, it can be defined as a result of the electromagnetic model and/or the thermal model for a certain point in time.

The thermal model can in particular comprise a mechanical model. Additionally or alternatively, the thermal model can comprise a fluid-dynamical model. In particular, by a fluid dynamical model, convection effects can also be computed.

An "update" in the meaning of this disclosure can be defined as an overall update, which replaces the instance of the first information provided by the electromagnetic model. Additionally or alternatively, an update can be an incremental update. This incremental update can be added to a quantity based on the first information provided by the electromagnetic model. This will be explained later in more detail.

An embodiment of the first aspect relates to a method, wherein the first information comprises a power-loss-related information.

A first information can comprise information related to an electrical power and/or energy loss. A power or energy loss can be caused by energy dissipated to an undesired energy form, such as heat or mechanical oscillation. An electrical power loss can be a power loss based on an electric and/or electronic effect. The source of an electrical power loss can be, for example, eddy currents, in particular eddy currents in an iron core or in a laminated core of an electrical motor. Also currents that are used for driving and/or controlling the motor can result in heat dissipation and can therefore cause electrical losses. Electrical losses can further be caused by hysteresis, radiation, dielectric losses, and/or corona discharges. Furthermore, electric losses can comprise losses that occur during an electric power transmission. Power-loss related information can further comprise copper losses, which relates to heat produced by electrical currents in the conductors of transformer windings, and/or other components of the electromechanical object. Power-loss related information can also comprise core losses, which result from induced currents in the components of an electromechanical object, and/or winding losses.

Additionally or alternatively, loss-related information can comprise information with respect to magnetic losses. Such losses can involve losses that are generated by one or more magnetic fields in or near the electromechanical object. Magnetic losses apply to energy dissipation taking place in a material when exposed to a magnetic field. This can also involve eddy current losses. Magnetic losses can comprise losses by energy dissipated when a magnetic field acts on a ferro- or a ferrimagnetic material. Magnetic losses can involve losses based on materials that are metallic and/or magnetic.

Loss-related information can also comprise information about one or more currents, voltages, and/or magnetic fields.

An embodiment of the first aspect relates to a method, wherein the first information comprises a temperature-related information.

The temperature-related information that is comprised by the first information can be in particular a temperature that is prevalent in the electromagnetic object during the time of the iteration of the multi-physics simulation. For example it can be a temperature of the electromagnetic object. The temperature-related information can comprise a temperature on which the computation of an electromagnetic loss is based on. The temperature-related information can comprise a temperature that is used for computing the electromagnetic model, at least for the actual iteration. The temperature-related parameter can be an estimated parameter, such as an estimated temperature for the electromechanical object. Additionally or alternatively, the temperature-related information can comprise a parameter that is chosen with respect to the multi-physics simulation. For example, it can comprise a temperature at which the multi-physics simulation shall simulate the electromechanical object. For example, it can comprise an operating temperature of the electromagnetic object, e.g. an operating temperature of an electrical motor. Additionally or alternatively, the temperature-related information can also comprise an ambient temperature. The ambient temperature can comprise, in particular, one or more temperatures at the beginning of the simulation or after a predefined simulated operating time of the electromechanical object.

An embodiment of the first aspect relates to a method, wherein the temperature-related information is related to a homogeneous temperature field.

The temperature-related information can comprise a homogeneous temperature field. In particular, the homogeneous temperature field can be represented by a scalar. This can be done in particular in order to facilitate the communication of this information. The homogeneous temperature can refer to a predefined part, a spatial location, and/or component of the electromagnetic object. Additionally or alternatively, the homogeneous temperature can refer to the whole electromagnetic object and/or to the surrounding temperature of the environment of the electromagnetic object. Additionally or alternatively, the homogeneous temperature field can be represented by a vector, a matrix and/or any other structure that comprises a plurality of temperature values that relate to different parts and/or spatial locations of the electromechanical object.

An embodiment of the first aspect relates to a method, wherein the computation of the update is based on a parameter of an electrical component of the object.

The update of the first instance of the first information, in particular of the loss-related information, is done in the thermal model. The update can in particular be computed based on the material and/or environmental properties of the electromechanical object. Material properties of the electromechanical object can be mechanical properties of one or more impedances present in the electromechanical object. Such impedances can comprise resistors, capacitors and/or inductors that are used for an electric control or a power supply of the electromechanical object. Furthermore, impedances can also be parasitic impedances, for example impedances generated by the housing of the electromechanical object and/or in a mechanical structure of the electromechanical object.

The first information, in particular the loss-related information, can be updated by computing the thermal model in different ways. In a first embodiment a new instance of the first information is computed, which substitutes the first instance provided by the electromagnetic model. Additionally or alternatively, an update can be computed by computing an additional amount of the first information based on the thermal model that can in particular be added to the first information provided by the electromagnetic model and/or by an information based on the first information, e.g. a complexity reduced information. These different methods to compute an update can also be used for computing updates of further instances of the first information.

The parameter can comprise one or more parameters related to one or more electrical components of the electromechanical object. The parameters can also be provided from the electromagnetic model to the thermal model, in particular at least partly.

An embodiment of the first aspect relates to a method, wherein the computation of the update is based on a parameter of a magnetic component of the object.

The parameter can comprise one or more parameters of one or more magnetic components of the electromechanical object. They can also be provided from the electromagnetic model to the thermal model, in particular at least partly.

An embodiment of the first aspect relates to a method, wherein the computation of the update comprises the step:
computing a heat source based on the first instance of the first information.

The first information can be transformed such that it suits the requirements of the thermal model, e.g. it can be transformed into an input format required by the thermal model. During this process, the particular instance of the first information can be processed further. This processing can comprise a capping, a filtering (in particular a high pass or a low pass filtering) and/or a statistical processing, such as an averaging, if the first information comprises more than one value. Such a processing can improve the computation of the update. In particular, the loss-related information can be transformed into a representation of a heat source. Such a source can be optimally processed and integrated into the thermal model. Furthermore, during the transformation of the loss-related information into a heat source, the provided information can be scaled with respect to an optimal computation of the thermal model. Additionally or alternatively the information can be scaled from a one- or two-dimensional information to a two- or three-dimensional information, respectively.

An embodiment of the first aspect relates to a method, comprising the step:
computing a first instance of a second information based on the thermal model.

The first instance of the second information is thereby based on the updated first instance of the first information. The second information can in particular be a temperature-related information and comprise one or more temperature values and/or temperature fields. The electromagnetic model can provide to the thermal model a loss-related information and based on an update of the loss-related information the thermal model provides a temperature. This temperature can be a homogeneous temperature. Additionally or alternatively, this temperature can be an inhomogeneous temperature field, which can be one, two or three-dimensional. Additionally or alternatively, the second information, in particular the temperature, can relate to one or more components of the electromechanical object. For example in case of an electric motor the temperature information can comprise a temperature for the rotor, a temperature for the stator and/or a temperature for the inverter. Furthermore, the second information can comprise information related to a simulation-related parameter. The simulation related parameter can for example comprise a grid with nodes that represent positions relative to the electromagnetic object. Hence, the temperature-related information can comprise a temperature information, e.g. a single temperature value, for each node of the grid. Hence, the second information can comprise a plurality of values, for example each related to a specific position in the electromechanical object. Additionally or alternatively, in particular in case of a linear system, a non-updated second information can be computed by the thermal model based on a first information from the electromagnetic model and an incrementally updated second information can be computed by the thermal model based on an incremental update. The none-updated second information and the incrementally updated information can be summarized before they are provided to the electromagnetic model. Additionally or alternatively, they can be provided separately within the second information.

An embodiment of the first aspect relates to a method, wherein the second information comprises a temperature-related information related to an inhomogeneous temperature field.

An embodiment of the first aspect relates to a method, wherein the temperature-related information comprises a plurality of inhomogeneous temperature fields.

The plurality of inhomogeneous temperature fields can be organized according to the different components of the electromechanical object. Additionally or alternatively, the inhomogeneous temperature field can be depending on a spatial grid.

An embodiment of the first aspect relates to a method, comprising the step:
providing the first instance of the second information to the electromagnetic model.

The multi-physics simulation can be performed by performing a plurality of iterations. Therefore, the second information computed by the thermal model based on an updated first information can be reflected to the electromagnetic model. Based on this information the electromagnetic model can compute a further instance of the loss-relatedinformation. The second information can in particular be processed before it is provided to the electromagnetic model. This processing can in particular comprise a scaling, a low pass and/or high-pass filtering, and/or a statistical processing, for example in averaging across different values of the second information. The processing can be adapted to the requirements of the electromagnetic model. In particular the processing of the second information can be adapted to a processing of the first information.

An embodiment of the first aspect relates to a method, computing one or more further iterations by performing the following steps one or more times:

computing a further instance of a first information based on the electromagnetic model;

providing the further instance of the first information to the thermal model;

computing an update of the further instance of the first information based on the thermal model;

computing a further instance of a second information based on the thermal model;

providing the further instance of the second information to the electromagnetic model.

An embodiment of the first aspect relates to a method, wherein the computing of a further iteration is terminated based on a termination criterion.

A criterion based on which the multi-physics simulation can be terminated may be based on a change between consecutive instances of the first information. When this change remains under a predefined threshold, it can be assumed that the simulation has entered a steady state. The solution of a multi-physics simulation in which consecutive instances of the first information do not change more than a predefined threshold can be defined as a consistent solution. A multi-physics simulation can be terminated, when a consistent solution is reached. The consistent solution can of course also be computed based on the second information. In particular, the consistent solution can be defined to be reached when consecutive instances of the first information as well as consecutive instances of second information remain below certain respective thresholds. Then the multi-physics simulation can be terminated or at least interrupted, in particular to receive new external parameters for further computations.

An embodiment of the first aspect relates to a method, wherein the method is terminated after the first instance of the update has been computed or after the first instance of the second information has been computed.

Based on the update mechanism described in this disclosure the multi-physics simulation can also yield a higher accuracy within a single iteration. Therefore, the multi-physics simulation can also be terminated after a predefined number of iterations. In particular this number of iterations can depend on external information. Additionally or alternatively, the pre-defined number can be predefined in advance, in particular it can be predefined that the simulation shall terminate after the single iteration. In any case, an iteration can be terminated after an update of the first instance of the first information is computed. Alternatively, the computation can be terminated after the first instance of the second information has been computed.

A second aspect relates to a method, comprising the steps:

computing a first instance of a first information based on a thermal model;

providing the first instance of the first information to an electromagnetic model.

computing an update of the first instance of the first information based on the electromagnetic model.

This method differs in principle from the method according to the first aspect. The computation of the update is computed based on the electromagnetic model. Based on the updated temperature-related information a more accurate result of the electromagnetic model can be achieved, without returning to the thermal model for the update process. Besides this principle difference, all structures and functions described above for methods according to the first aspect can also be implemented mutatis mutandis for methods according to the second aspect.

A third aspect relates to a device, configured to:

compute a first instance of a first information based on one of the following models:

a) an electromagnetic model;

b) a thermal model;

provide the first instance of the first information to the respective other model;

compute an update of the first instance of the first information based on the respective other model, i.e. on the basis of the model which the first instance of the first information was provided to.

The device can be in particular implemented to perform methods according to the first and/or to the second aspect.

Other embodiments can include a non-transitory computer readable media storing instructions which, when executed by one or more processors, perform methods according to the first and/or to the second aspect.

This written description describes exemplary embodiments of the disclosure, but other variations fall within scope of the disclosure. For example, the systems and methods may include and utilize data signals conveyed via networks (e.g., local area network, wide area network, internee, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein, The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

The methods and systems described herein may be implemented using any suitable processing system with any suitable combination of hardware, software and/or firmware, such as described below with reference to the non-limiting examples of FIGS. 3 and 4A-4C.

REFERENCE CHARACTER LIST

100 Method according to an embodiment of disclosure
110-190 Method steps
201 the beam is incident
202 first boundary layer
203 Angle
204 Normal on the first boundary layer
205 free path length of the refracted beam
206 Angle of the refracted beam
207 Angle of the refracted beam on the second boundary layer
208 second boundary layer
209 Normal to the second boundary layer
210-240 Function of angles of incidence on beams intensities
211 Abscissa
212 ordinate
213 Curve of function 210
221 Curve of function 220
231 Curve of function 230
241 Curve of the function 240
300 Computer environment
302 User
304 System
306 Server
308 Network
310 Data memory
312 first date
314 second date
400a System
402 Processing system
404 System
406 Computer-readable memory
408 Data memory
410 first date
412 second date

What is claimed is:

1. A method for simulating an electromechanical object, the method comprising:
executing, by a data processing system in a multi-physics simulation of an object, an electromagnetic solver for an electromagnetic model of the object to generate a first data instance in a first format indicative of an electromagnetic loss of the object at a reference temperature;
communicating, by the electromagnetic solver to a thermal model of the object, the first data instance to the thermal model;
receiving, by the thermal model from the electromagnetic solver, the first data instance;
determining, by the data processing system, a temperature dependent electromagnetic loss of the object based on the electromagnetic loss at the reference temperature modified by a loss modifier that is generated based at least in part on material properties of the object, the temperature dependent electromagnetic loss varies according to a temperature of the object;
transforming, by the data processing system, the first data instance into a second data instance by capping and/or filtering data of the first data instance, the second data instance being representative of a heat source that is integrated into a thermal solver of the thermal model;
formatting the second data instance into a second format configured for input to the thermal solver;
executing, by the data processing system during the simulation of the object, the thermal solver for the thermal model of the object comprising receiving the second data instance and computing an estimated temperature of the object based on the temperature dependent electromagnetic loss of the object and the reference temperature;
communicating, by the thermal solver to the electromagnetic model, the estimated temperature of the object for generation by the electromagnetic solver of an updated electromagnetic loss of the object at the estimated temperature; and
iteratively invoking, by the data processing system, the thermal solver and the electromagnetic solver until an updated electromagnetic loss of the object in a next iteration is within a threshold of the electromagnetic loss of the object in a prior iteration.

2. The method of claim 1, further comprising:
comparing the estimated temperature and the reference temperature; and
determining a temperature of the object according to the comparison.

3. The method of claim 2, wherein the comparison indicates the estimated temperature and the reference temperature are not consistent, the method further comprising:
invoking the electromagnetic solver for an-the electromagnetic model of the object to generate an updated electromagnetic loss of the object at the estimated temperature.

4. The method of claim 3, wherein the updated electromagnetic loss at the reference temperature is received from the electromagnetic solver for the electromagnetic model.

5. The method of claim 3, wherein the electromagnetic model includes the material properties of the object, the method further comprising:
updating the material properties according to the estimated temperature.

6. The method of claim 5, wherein the object includes a resistor, a capacitor or an inductor and wherein the material properties include impedances of the resistor, the capacitor or the inductor.

7. The method of claim 1, wherein the temperature dependent electromagnetic loss is formulated as a combination of the electromagnetic loss at the reference temperature and a temperature dependent loss modifier based on a difference between a temperature and the reference temperature.

8. The method of claim 7, wherein the object includes a conductor with a current source and wherein the temperature dependent loss modifier is proportionally related to the difference between a temperature and the reference temperature.

9. The method of claim 7, wherein the object includes a conductor with a voltage source and wherein the temperature dependent loss modifier is inversely related to the difference between a temperature and the reference temperature.

10. A non-transitory machine readable medium storing executable program instructions which when executed by a data processing system cause the data processing system to perform a method comprising:

executing, by the data processing system in a multi-physics simulation of an object, an electromagnetic solver for an electromagnetic model of the object to generate a first data instance in a first format indicative of an electromagnetic loss of the object at a reference temperature;

communicating, by the electromagnetic solver to a thermal model of the object, the first data instance to the thermal model;

receiving, by the thermal model from the electromagnetic solver, the first data instance;

determining, by the data processing system, a temperature dependent electromagnetic loss of the object based on the electromagnetic loss at the reference temperature modified by a loss modifier that is generated based at least in part on material properties of the object, the temperature dependent electromagnetic loss varies according to a temperature of the object;

transforming, by the data processing system, the first data instance into a second data instance by capping and/or filtering data of the first data instance, the second data instance being representative of a heat source that is integrated into a thermal solver of the thermal model;

formatting the second data instance into a second format configured for input to the thermal solver;

executing, by the data processing system during the multi-physics simulation of the object, the thermal solver for the thermal model of the object comprising receiving the second data instance and computing an estimated temperature of the object based on the temperature dependent electromagnetic loss of the object and the reference temperature;

communicating, by the thermal solver to the electromagnetic model, the estimated temperature of the object for generation by the electromagnetic solver of an updated electromagnetic loss of the object at the estimated temperature; and iteratively invoking, by the data processing system, the thermal solver and the electromagnetic solver until an updated electromagnetic loss of the object in a next iteration is within a threshold of the electromagnetic loss of the object in a prior iteration.

11. The medium of claim 10, further comprising:

comparing the estimated temperature and the reference temperature; and determining a temperature of the object according to the comparison.

12. The medium of claim 11, wherein the temperature of the object is determined as the estimated temperature, wherein a difference between the estimated temperature and the reference temperature is within a preset threshold according to the comparison.

13. The medium of claim 11, wherein the comparison indicates the estimated temperature and the reference temperature are not consistent, the method further comprising:

invoking the electromagnetic solver for the electromagnetic model of the object to generate an updated electromagnetic loss of the object at the estimated temperature.

14. The medium of claim 13, wherein the updated electromagnetic loss at the reference temperature is received from the electromagnetic solver for the electromagnetic model.

15. The medium of claim 13, wherein the electromagnetic model includes the material properties of the object, the method further comprising:

updating the material properties according to the estimated temperature.

16. The medium of claim 15, wherein the object includes a resistor, a capacitor or an inductor and wherein the material properties include impedances of the resistor, the capacitor or the inductor.

17. The medium of claim 10, wherein the temperature dependent electromagnetic loss is formulated as a combination of the electromagnetic loss at the reference temperature and a temperature dependent loss modifier based on a difference between a temperature and the reference temperature.

18. The medium of claim 17, wherein the object includes a conductor with a current source and wherein the temperature dependent loss modifier is proportionally related to the difference between a temperature and the reference temperature.

19. The medium of claim 17, wherein the object includes a conductor with a voltage source and wherein the temperature dependent loss modifier is inversely related to the difference between a temperature and the reference temperature.

20. A system, comprising a memory storing instructions;

one or more processors coupled to the memory, the one or more processors executing the instructions from the memory, the one or more processors configured to perform a method for simulating an electromechanical object, the method comprising:

executing an electromagnetic solver for an electromagnetic model of the object to generate a first data instance in a first format indicative of an electromagnetic loss of the object at a reference temperature;

communicating, by the electromagnetic solver, the first data instance to a thermal model;

determining a temperature dependent electromagnetic loss of the object based on the electromagnetic loss at the reference operating temperature modified by a loss modifier that is generated based at least in part on material properties of the object, the temperature dependent electromagnetic loss varies according to a temperature of the object;

transforming the first data instance into a second data instance by capping and/or filtering data of the first data instance, the second data instance being representative of a heat source that is integrated into a thermal solver of the thermal model;

formatting the second data instance into a second format configured for input to the thermal solver;

executing a thermal solver for the thermal model of the object comprising receiving the second data instance and computing an estimate of a temperature of the object based on the temperature dependent electromagnetic loss of the object and the reference temperature;

communicating, by the thermal solver to the electromagnetic model, the estimate of the temperature of the object for generation by the electromagnetic solver of an updated electromagnetic loss of the object at the estimated temperature; and iteratively invoking the thermal solver and the electromagnetic solver until an updated electromagnetic loss of the object in a next iteration is within a threshold of the electromagnetic loss of the object in a prior iteration.

* * * * *